United States Patent
Wanigatunga et al.

(10) Patent No.: US 6,592,801 B2
(45) Date of Patent: Jul. 15, 2003

(54) PHOTOPOLYMERIZATION OF EPISULFIDES USING METAL COMPLEXES AND ITS USE FOR MAKING OPHTHALMIC LENSES

(75) Inventors: Sirisoma Wanigatunga, Largo, FL (US); Yassin Yusef Turshani, Largo, FL (US); Peiqi Jiang, Palm Harbor, FL (US)

(73) Assignee: Essilor International Compagnie Generale d'Optique, Charenton cedex (FR)

( * ) Notice: Subject to any disclaimer, the term of this patent is extended or adjusted under 35 U.S.C. 154(b) by 36 days.

(21) Appl. No.: 09/846,669

(22) Filed: Apr. 30, 2001

(65) Prior Publication Data

US 2003/0022956 A1 Jan. 30, 2003

(51) Int. Cl.[7] .............................. C08G 75/08; C08J 3/28; B29C 39/02
(52) U.S. Cl. ........................... 264/496; 522/25; 522/28; 522/29; 522/168; 522/169
(58) Field of Search .............................. 522/25, 28, 29, 522/168, 169; 264/496

(56) References Cited

U.S. PATENT DOCUMENTS

| | | | | |
|---|---|---|---|---|
| 4,662,376 A | | 5/1987 | Belanger ..................... 128/361 |
| 4,675,328 A | | 6/1987 | Cassal et al. ................ 514/345 |
| 4,775,733 A | | 10/1988 | Kanemura et al. ............ 528/67 |
| 4,821,050 A | * | 4/1989 | Yabe et al. ............... 346/135.1 |
| 5,359,017 A | * | 10/1994 | Hamazu et al. .............. 526/171 |
| 5,374,668 A | * | 12/1994 | Kanemura et al. ........... 359/642 |
| 5,502,083 A | * | 3/1996 | Abe et al. ...................... 522/11 |
| 5,652,280 A | | 7/1997 | Kutal ............................. 522/66 |
| 5,807,975 A | | 9/1998 | Amagai et al. .............. 528/373 |
| 5,877,230 A | | 3/1999 | Kutal ............................. 522/66 |
| 6,303,805 B1 | * | 10/2001 | Lyu et al. .................... 502/152 |
| 2001/0047043 A1 | * | 11/2001 | Okoroafor et al. ............ 522/31 |
| 2002/0010313 A1 | * | 1/2002 | Smith et al. ................. 528/373 |

FOREIGN PATENT DOCUMENTS

| | | |
|---|---|---|
| EP | 271839 | 6/1988 |
| EP | 394495 | 10/1990 |
| EP | 761665 | 3/1997 |
| EP | 785194 | 7/1997 |
| EP | 0896974 | 2/1999 |
| EP | 921417 | 6/1999 |
| EP | 942027 | 9/1999 |
| EP | 1006374 | 6/2000 |
| EP | 1058133 | 12/2000 |
| JP | 2000226480 | 8/2000 |
| WO | WO 97/32913 | 9/1997 |
| WO | WO 00/26272 | 5/2000 |

* cited by examiner

*Primary Examiner*—Susan W. Berman
(74) *Attorney, Agent, or Firm*—Fulbright & Jaworski L.L.P.

(57) ABSTRACT

A process for polymerizing episulfide monomers comprising the steps of:

(c) mixing to an episulfide monomer or a mixture of episulfide monomers an effective amount of at least one photopolymerization catalyst selected from the group consisting of (cyclopentadienyl) ruthenium and osmium complexes and an effective amount of at least a co-catalyst selected from phosphonium salts, phosphines and amines; and (d) irradiating the mixture of (a) with an ultra-violet radiation to polymerize the mixture.

35 Claims, 1 Drawing Sheet

PHOTOPOLYMERIZATION OF EPISULFIDES USING METAL COMPLEXES AND ITS USE FOR MAKING OPHTHALMIC LENSES

BACKGROUND OF THE INVENTION

The present invention concerns a method for photopolymerizing episulfides in the presence, as polymerization catalyst, of at least one metal complex, in particular a ruthenium complex, and to the use of such a photopolymerization method for making episulfide based ophthalmic lenses.

The use of ruthenium cyclopentadienyl complexes for anionic photopolymerization of 2-cyanoethylacrylate has been disclosed in U.S. Pat. No. 5,652,280.

Thermal polymerization of episulfides is known from U.S. Pat. No. 5,807,975, EP 761,665, EP 785,194 and EP 942,027. These disclosed polymerization processes need long thermal polymerization cycles.

Photo-initiated cationic polymerization of monoepisulfides is disclosed in article "Photocationic cross-linking of poly(2,3-epithiopropyl methacrylate) and Photoinitiated cationic polymerization of its model compounds", M. Tsunooka et al., Journal of Polymer Science: polymer chemistry edition, vol. 22, 2217–2225 (1984). However, the photoinitiators used in the polymerization are coloured materials that are not suitable for making optical lens material.

International patent application WO 00/26272 discloses a process for making thio containing resins which comprises polymerizing a composition comprising at least one diepisulfide compound and, as polymerization catalyst, an alkaline metal, alkaline-earth metal or ammonium salt of an acid having a pKa from 0.5 to 14.

Although this later polymerization process leads to fast polymerization of the composition, the process is difficult to control due to the highly exothermic polymerization reaction which may result in a charred resin inappropriate for making optical articles such as ophthalmic lenses.

SUMMARY OF THE INVENTION

Thus, one object of the invention is to provide a photopolymerization process of episulfides, in particular diepisulfides, which allows fast and safe polymerization.

Another object of the invention is to provide a fast and safe process for making episulfide based optical articles, in particular ophthalmic lenses.

These and other objects of the invention are achieved by providing a photopolymerization process of episulfides monomers which comprises:

(a) mixing to an episulfide monomer or a mixture of episulfide monomers an effective amount of at least one photopolymerization catalyst selected from (cyclopentadienyl) ruthenium complexes and (cyclopentadienyl) osmium complexes, and an effective amount of at least one co-catalyst selected from phosphonium salts, phosphines and amines; and (b) irradiating the mixture of (a) with an ultraviolet (UV) radiation to polymerize the mixture.

Preferably, there is also added to the mixture of (a) an effective amount of a co-catalyst selected from the group consisting of phosphorous and amine compounds.

The present invention also contemplates a process for making an optical article which comprises:

(a) filling a mold cavity with a photopolymerizable composition comprising at least one episulfide monomer and an effective amount of a photopolymerization catalyst selected from the group consisting of (cyclopentadienyl) ruthenium complexes and (cyclopendienyl) osmium complexes, and an effective amount of at least one co-catalyst selected from phosphonirum salts, phosphines and amines; and (b) irradiating the polymerizable composition with an UV radiation for polymerizing the composition at least up to obtention of a self-supporting gel.

Preferably, the composition is subjected to a pre-heating step before irradiation step (b).

Also, preferably, after irradiation step (b), the gellified article is subjected to a post-heating step to achieve full polymerization of the article.

DETAILED DESCRIPTION OF THE PREFERRED EMBODIMENTS

Figure 1:
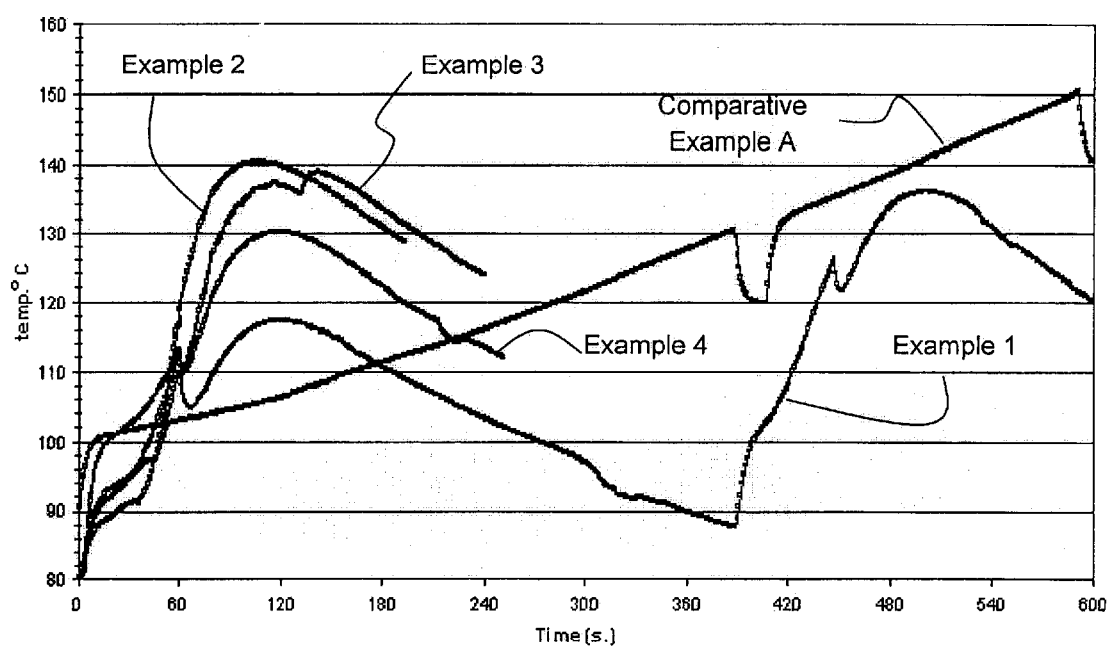
FIG. 1 shows temperature-time graphs of the polymerization reactions for various compositions according to the invention.

The episulfide compounds that can be used in the process of the invention can be mono or polyepisulfide compounds, but are preferably diepisulfide compounds.

The episulfide compounds can be defined as compounds comprising at least one episulfide functional group of formula:

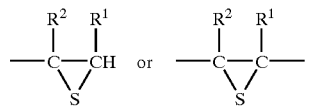

in which $R^1$ and $R^2$ are, independently from each other, H, alkyl, aryl, alkoxy, aryloxy, alkylthio or arylthio.

The episulfide compounds may include other polymerizable functional groups such as epoxy, thiol, ethylenic such as a vinyl, (meth)acrylate, carboxylic acid or anhydride, thiocarboxylic acid, thio alcohol, thiophenol, phenol, antine or amide groups.

The preferred episulfide monomers are diepisulfides.

Suitable diepisulfide monomers are diepisulfides of formula:

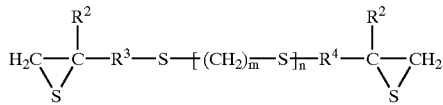

in which $R^2$ is defined as above, $R^3$ and $R^4$, independently from each other, represent:

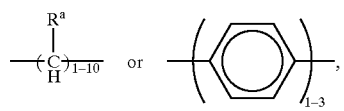

where $R^a$ designates H, alkyl, aryl, alkoxy, aryloxy, alkylthio or arylthio and, n is an integer from 0 to 4 and m is an integer from 0 to 6.

The preferred diepisulfide monomers are those having at least one intramolecular disulfide bond.

A preferred class of diepisulfide monomers is comprised of diepisulfide monomers of formula:

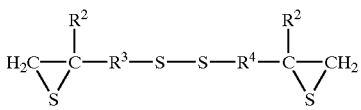

in which $R^2$, $R^3$ and $R^4$ are defined above.

In $R^2$, $R^3$, $R^4$ and $R^a$, the alkyl and alkoxy groups are preferably $C_1$–$C_6$ more preferably $C_1$–$C_4$ alkyl and alkoxy groups such methyl, ethyl, propyl, butyl, methoxy, ethoxy, propoxy and butoxy.

Specific examples of diepisulfide monomers are bis(2,3-epithiopropyl)disulfide, bis(2,3-epithiopropyldithio) methane, bis(2,3-epithiopropyldithio)ethane, bis(6,7-epithio-3,4-dithioheptane)sulfide, 1,4-dithian-2,5-bis(2,3-epithiopropyldithiomethyl), 1,3-bis(2,3-epithiopropyldithiomethyl)benzene, 1,6-bis(2,3-epithiopropyldithio)-2-(2,3-epithiopropyldithioethylthio)-4-thiahexane and 1,2,3-tris(2,3-epithiopropyldithio)propane.

The preferred diepisulfide monomers are bis-2,3 (epithiopropyl) sulfide and bis-2,3-(epithiopropyl)disulfide of formulas:

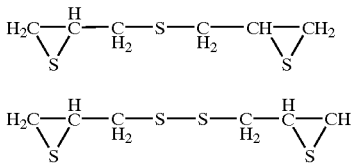

Episulfides as defined above are disclosed in EP 761,665 and EP 942,027.

Although the polymerizable composition may only include an episulfide monomer or a mixture of different episulfide monomers as polymerizable monomers, it can also include other photopolymerizable monomers such as thiol monomers and/or (meth)acrylate monomers.

It can also include small amounts of epoxy monomers.

The (meth)acrylate monomers for use in the process of the invention can be any (meth)acrylate classically employed for making organic glass articles such as optical articles, and in particular ophthalmic lenses.

Typical examples of (meth)acrylate monomers include ethylene glycol dimethacrylate, propylene glycol dimethacrylate, teramethylene glycol dimethacrylate, polyethylene glycol dimethacrylate, tiimethylolpropane triaciylate, pentaerythritolpropane trimethacrylate, ethoxylated bisphenol-A diacrylate, 1,6-hexanediol dimethacrylate, urethane diacrylate and epoxy diacrylate.

A preferred diacrylate monomer is the diacrylate of formula:

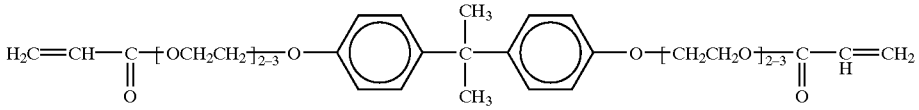

The thiol monomers can be represented by formula:
R'(SH)$_{n'}$ in which n' is an integer from 2 to 6 and preferably 2 to 3, and R' is an organic group of valency equal to n'.

Useful polythiols are disclosed in EP 394,495 and in U.S. Pat. No. 4,775,733.

Among the polythiol monomers there may be cited aliphatic polythiols such as pentaerythritol tetrakis mercaptopropionate, 1-(1'-mercaptoethylthio)-2,3-dimercaptopropane, 1-(2'-mercaptopropylthio)-2,3-dimercaptopropane, 1-(3'-mercaptopropylthio)-2,3-dimercaptopropane, 1-(4'-mercaptobutylthio)-2,3-dimercaptopropane, 1-(5'-mercaptopentylthio)-2,3-dimercaptopropane, 1-(6'-mercaptohexylthio)-2,3-dimercaptopropane, 1,2-bis(4'-mercaptobutylthio)-3-mercaptopropane, 1,2-bis(5'-mercaptopentylthio)-3-mercaptopropane, 1,2-bis(6'-mercaptohexylthio)-3-mercaptopropane, 1,2,3-tris(mercaptomethylthio)propane, 1,2,3-tris(3'-mercaptopropylthio)propane, 1,2,3-tris(2'-mercaptoethylthio)propane, 1,2,3-tris(4'-mercaptobutylthio) propane, 1,2,3-tris(6'-mercaptohexylthio)propane, 1,2-ethanedithiol, 1,1-propanedithiol, 1,2-propanedithiol, 1,3-propanedithiol, 2,2-propanedithiol, 1,6-hexanetbiol-1,2,3-propanetrithiol, 1,2-bis(2'-mercaptoethylthio)-3-mercaptopropane, 1,2,3-trimethylolpropane tri(thioglycolate), pentaerythritol tetra(thioglycolate), pentaerytliritol tetra(3-mercaptopropionate), 1,2,3-trimethylolpropane tri(3-mercaptopropionate), thioglycerol dithioglycerol, trithioglycerol, dipentaerythritol hexa(2-mercaptoacetate), and 3,4,5,6-tetrachloro-1,2-dimercapto benzene.

Preferred polythiols are:
C[CH$_2$ OCOCH$_2$ CH$_2$SH]$_4$
HSCH$_2$CH$_2$SCH(CH$_2$SH)CH$_2$SCH$_2$CH$_2$SH
HSCH$_2$CH$_2$SCH$_2$CH$_2$SH These additional monomers can generally be present in the composition up to 50% by weight based on the total weight of monomers in the composition, preferably up to 25% by weight.

It has been found that adding a small amount of an epoxy monomer, preferably no more than 10% by weight based on the total weight of monomers in the composition, generally decreases the gel time of the overall composition and leads to an optical lens having very good optical quality (in particular absence of striations).

Adding a small amount of epoxy monomer allows to use smaller amounts of ruthenium catalyst in the composition and to keep a high rate of polymerization.

Specific epoxy compounds which may be used include, but are not limited to phenolic epoxy compounds prepared by condensation of an epihalohydrin with a polyphenol including bisphenol-A glycidyl ether; alcoholic epoxy compounds prepared by condensation of an epihalohydrin with a polyalcohol including hydrogenated bisphenol-A glycidyl ether; glycidyl ester epoxy compounds prepared by condensation of an epihalohydrin with an organic polyacid derivatives including 3,4-epoxycyclohexyhnethyl-3',4'-epoxycyclohexane carboxylate and diglycidyl 1,2-hexahydrophthalate; amino epoxy compounds prepared by condensation of an epihalohydrin with a secondary amine; and aliphatic polyepoxy compounds such as vinylcyclohexene diepoxide.

Other suitable epoxy compounds are disclosed in EP 921,417 which is incorporated by reference.

Preferred epoxy compounds are those which do not contain an unsaturation and those which have two epoxy groups.

Specific suitable epoxy compounds are high refractive index epoxy compounds derived in particular from bisphenol-A or fluorene.

Another preferred epoxy compound is:

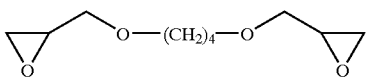
(Z)

The photopolymerization catalyst is selected among ruthenium and osmium (cyclopentadienyl) metal complexes.

The preferred catalysts are bis(cyclopentadienyl) ruthenium complexes.

The metal complexes can be represented by formula:

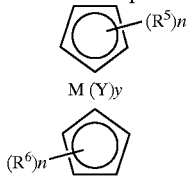

in which $R^5$ and $R^6$, independently from each other, represent a linear or branched alkyl group, preferably a $C_1-C_6$ alkyl group, such as methyl, ethyl, propyl, isopropyl, butyl, isobutyl, t-butyl, pentyl, cyclopentyl, isopentyl, neopentyl, hexyl, isohexyl and cyclohexyl; an alkoxy group, preferably a $C_1-C_{10}$ alkoxy group, such as methoxy, ethoxy, propoxy and butoxy; an aryl group, such as phenyl, which can be substituted with one or more alkyl and/or alkoxy groups and n is an integer from 0 to 5, M is a metal selected from Ru and Os, Y is Cl, Br, I or H depending on the metal, and y is an integer from 0 to 2.

Preferably, n is equal to zero.

The preferred photopolymeiization catalyst is

(III)

The amount of photopolymerization catalyst used may widely vary, but usually ranges from 0.1 to 10% by weight, preferably 1 to 5% by weight, based on the total weight of polymerizable monomers in the composition.

To improve the polymerization rate a co-catalyst is used conjointly with the above described photopolymerization catalyst.

These co-catalysts include phosphorous compounds such as phosphonium salts and phosphine compounds, and amine compounds.

The preferred phosphonium salts can be represented by formula:

$(R'')_4P^+X^-$ in which each R" is independently an alkyl group, typically a $C_1-C_6$ alkyl group such as methyl, ethyl, propyl and butyl; an alkoxy group, typically a $C_1-C_6$ alkoxy group such as methoxy, ethoxy and propoxy; or aryl group, such as a phenyl group, which can be substituted with one or more alkyl groups; and X is an anion preferably selected from the group consisting of $OH^-$, $Br^-$, $Cl^-$, $I^-$, $SH^-$, $CN^-$, $NO_2^-$, $SO_2^-$ and $COOH^-$, preferably $Br^-$ and $Cl^-$.

The most preferred phosphonium salts are tetra alkyl phosphonium bromides and chlorides and in particular tetra butyl phosphonium bromide (TBPB).

The preferred phosphine compounds can be represented by formula:

in which each R'" is independently an alkyl group, typically a $C_1-C_6$ alkyl group such as methyl, ethyl, propyl and butyl; an alkoxy group, typically a $C_1-C_6$ alkoxy group such as methoxy, ethoxy and propoxy; or an alkyl group, such as a phenyl group, which can be substituted with one ore more alkyl, alkoxy or halogeno groups.

The most preferred phosphines are triphenylphosphine (TPP), trimethoxyphenylphosphine (TMPP) and trichlorophenylphosphine (TCPP).

The amines can be primary, secondary or tertiary amines.

Examples of amines useful as co-catalyst in the present process are $(R'')_4N^+X^-$, $(R'')_3N$, $(R'')_2NH$ and $R''NH_2$ in which R' and $X^-$ are as defined above.

The amount of co-catalyst used generally ranges from 0.005 to 1% by weight based on the total weight of the monomers and catalyst in the composition, preferably from 0.01 to 0.5%.

The polymerizable composition can include other additives typically used for making optical articles in the usual amounts, such as UV stabilizers, UV absorbers, mold release agents, dyes and pigments including photochromic compounds, anti-yellowing agents, anti-oxidants, perfumes and deodorants.

UV stabilizers include those well known in the art in particular those commercialized under the tradenames PARSOL HS, UV 5411, UV 9, TINUVIN 400, TINUVIN P and TINUVIN 312 and are generally used in amounts up to 0.4% by weight of the total weight of the polymerizable monomers.

Mold release agents can be external or internal and include mono and dialkylphosphates, silicones, fluorinated hydrocarbons, fatty acids and ammonium salts. The preferred mold release agents are mono and dialkylphosphates and mixtures thereof. Such release agents are disclosed in U.S. Pat. Nos. 4,662,376, 4,675,328 and EP 271,839.

The mold release agents are typically used in amounts up to 0.1% of the total polymerizable monomer weight.

Dyes include classical dyes such as disperse dyes, cation dyes, basic dyes, acidic dyes as well as photochromic compounds such as spirooxazines and chromenes.

Anti-oxidants include those well known in the art and can preferably be phenolic compounds such as IRGANOX® DW245 commercialized by CIBA.

Irradiation step comprises irradiating the polymerizable monomer composition with a UV light (wavelength from 200 to 400 nm). The wavelength will depend on the specific photopolymerization catalyst and, eventually the co-catalyst, used in the process in order to obtain a maximum light absorption.

Irradiation may be effected in one single shot or using multiple separated shots.

Total irradiation duration, whether effected in one single shot or through multiple separated shots, usually ranges from 1 to 5 minutes, preferably 1 to 2 minutes.

Preferably, before irradiation, the composition is subjected to a preheating step, for increasing the polymerization composition temperature to a temperature of 70° C. to 90° C., typically about 80° C.

Also, after irradiation, the mold assembly may be subjected to a post-heating step at a temperature of 80° C. to 120° C., preferably 20° C. to 100° C. for 1 to 2 hours, for example in an air-heated oven, to achieve curing of the composition.

The following examples illustrate the present invention. In the examples, unless otherwise stated all parts and percentages are by weight.

EXAMPLES 1 TO 7

Comprative Examples A and B

Compositions containing diepisulfide monomer of formula (I), bis(cyclopentadienyl) ruthenium catalyst of formula (III) and eventually a co-catalyst were placed inside a 2 mm thick, 6 base plano lens two-piece mold assembly made of mineral glass and subjected to various polymerization conditions.

Compositions and polymerization conditions are given in Table I below. Results are also given in Table I:

TABLE I

| | Example n° | | | | | | | | |
|---|---|---|---|---|---|---|---|---|---|
| | A | B | 1 | 2 | 3 | 4 | 5 | 6 | 7 |
| Composition | | | | | | | | | |
| Diepisulfide monomer (I) (%) | 98 | 98 | 98 | 98 | 98 | 98 | 98 | 98 | 98 |
| Ruthenium catalyst (III) (%) | 2 | 2 | 2 | 2 | 2 | 2 | 2 | 2 | 2 |
| Co-catalyst (%) | | | | | | | | | |
| TBPB | — | 0.01 | — | 0.02 | 0.01 | 0.01 | — | — | — |
| TPP | — | — | — | — | — | — | 0.01 | — | — |
| TMPP | — | — | — | — | — | — | — | 0.01 | — |
| TCPP | — | — | — | — | — | — | — | — | 0.01 |
| Pre-heating | | | | | | | | | |
| ° C. | 150 | 115 | 80 | 80 | 80 | 80 | 80 | 80 | 80 |
| UV Irradiation | | | | | | | | | |
| Intensity (mW/cm$^2$) | — | — | 225 | 225 | 225 | 175 | 175 | 175 | 175 |
| Number of shots | — | — | 2 | 1 | 1 | 1 | 1 | 1 | 1 |
| Duration of shots (D) | — | — | 60/60 | 60 | 60 | 60 | 60 | 60 | 60 |
| Gel | No | No | Yes | Yes | Yes | Yes | Yes (soft) | Yes (hard) | Yes (soft) |

EXAMPLES 8 TO 13

Various compositions were placed in a typical two-piece mold assembly made of frosted mineral glass in view of preparing 2 mm thick, 6 base plano lenses.

Compositions, polymerization conditions and results are given in Table II:

TABLE II

| | Example n° | | | | | |
|---|---|---|---|---|---|---|
| | 8 | 9 | 10 | 11 | 12 | 13 |
| Composition | | | | | | |
| Diepisulfide monomer (I) (%) | 98 | 98 | 98 | 98 | 98 | 98 |
| Rhutenium catalyst (III) (%) | 2 | 2 | 2 | 2 | 2 | 2 |
| TBPB, co-catalyst (%) | 0.01 | 0.01 | 0.01 | 0.01 | 0.01 | 0.01 |
| Blue dye (ppm) | — | — | 0.56 | 0.56 | 1.12 | 2.24 |
| Pre-heating | | | | | | |
| °0 C. | 80 | 80 | 80 | 80 | 80 | 80 |
| UV irradiation | | | | | | |
| Intensity (mW/cm$^2$) | 100 | 100 | 100 | 100 | 100 | 100 |
| Number of shots | 1 | 2 | 1 | 2 | 3 | 2 |
| Duration of shots (s) | 60 | 45/30 | 45 | 30/30 | 30/15/15 | 30/30 |
| Gel | Yes | Yes | Yes | Yes | Yes | Yes |
| Post-heating | | | | | | |
| ° C. | 90 | 90 | 90 | 90 | 90 | 1000 |
| Time (hours) | 1, 25 | 1, 25 | 1, 25 | 1, 25 | 1, 25 | 1, 25 |
| Lens properties | | | | | | |
| % transmission | — | — | — | — | 86.2 | 85.1 |
| % Haze | — | — | — | — | 2.11 | 3.19 |
| Barcol | — | — | — | — | 83.9 | 89.4 |
| Yellow index | — | — | — | — | 3.92 | 0.9 |

EXAMPLES 14 TO 16

Examples 14 to 16 describe polymerization of compositions having lower concentration of ruthenium catalyst than in preceding examples (see Table III).

The weight percentage of catalyst and co-catalyst is based on the total weight (100) of the monomers present in the composition.

For examples 14 to 16, the ruthenium catalyst is first added to the monomer composition (diepisulfide (I) and, depending on the example, epoxy monomer (Z)).

Then the mixture is stirred at 50° C. during about one hour. TBPB is added thereafter.

The compositions are filled in a mold as described in examples 1 to 7.

Polymerization conditions and results are given in Table III below.

It can be seen from Table III, in examples 14 and 15, that it takes half time of UV curing for obtaining a gel than it takes in example 16 where the composition does not contain an epoxy monomer.

TABLE III

| Composition | Ex. 14 | Ex. 15 | Ex. 16 |
|---|---|---|---|
| Diepisulfide monomer I | 95% | 95% | 100% |
| Epoxy monomer Z | 5% | 5% | |
| Ru-catalyst III | 0.50% | 0.25% | 0.50% |
| Ru-cat dissolving | 50° C. for 1 hr | 50° C. for 1 hr | 50° C. for 1 hr |
| TBPB (cocatalyst) | 0.10% | 0.10% | 0.10% |
| Cure Conditions | | | |
| Pre-heating | 27° C. | 27° C. | 27° C. |
| UV intensity | 100 mW/cm | 100 mW/cm | 100 mW/cm |
| Exposure time | Total 2.5 mins | Total 2.5 mins | Total 5 mins |
| Max. Temp. During UV | 77° C. | 91° C. | 92° C. |
| Gelation | Short time gel | Short time gel | |
| Post-heating ° C./time | 100/2 hrs | 100/2 hrs | 100/2 hrs |
| Lens Performance | | | |
| Striation* | No | No | Some |
| Soft-temp** | >80° C. | >80° C. | >80° C. |
| Transparent | Yes | Yes | Yes |
| Refractive index | 1.7 | 1.7 | 1.71 |
| Abbe no | 36 | 36 | 36 |

*inspected visually
**softening temperature

Transmission was measured using Haze-guard plus instrument. The instrument was calibrated using a standard prior to measurement with actual samples.

Haze was measured using Haze-guard instrument which was calibrated with a standard prior to measurement with actual samples.

Barcol was measured using Barcol instrument calibrated with a standard prior to the measurement with actual samples. Yellow index was spectroscopically determined according to ASTM-D-1925–63.

What is claimed is:

1. A process for polymerizing episulfide monomers comprising the steps of:
   (a) mixing to an episulfide monomer or a mixture of episulfide monomers an effective amount of at least one photopolymelization catalyst selected from the group consisting of (cyclopentadienyl) ruthenium and osmium complexes and an effective amount of at least a co-catalyst selected from phosphonium salts, phosphines and amines; and
   (b) irradiating the mixture of (a) with an ultra-violet radiation to polymerize the mixture.

2. The process of claim 1, wherein the photopolymerization catalyst is selected from complexes of formula:

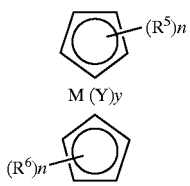

in which $R^5$ and $R^6$, independently from each other, represent a linear or branched alkyl group, or an aryl group, n is an integer from 0 to 5, M is a metal selected from the group consisting of Ru and Os, Y is Cl, Br, I or H, and y is an integer from 0 to 2.

3. The process of claim 2 wherein M is Ru.

4. The process of claim 1, wherein the photopolymerizable catalyst is bis(cyclopentadienyl)ruthenium.

5. The process of claim 1, wherein the amount of photopolymerization catalyst ranges from 0.1 to 10% by weight based on the total weight of monomers present in the mixture.

6. The process of claim 1, wherein the phosphonium salts are salts of formula:

$$(R'')_4P^+X^-$$

in which each R" is independently an alkyl group, an alkoxy group or an aryl group which can be substituted with one or more alkyl and/or alkoxy groups; and X is an anion.

7. The process of claim 1, wherein the phosphines have formula:

$$(R''')_3P$$

in which each R'" is independently an alkyl group, an alkoxy group or an aryl group which can be substituted with one ore more alkyl, alkoxy or halogeno groups.

8. The process of claim 1, wherein the amines are selected from amines of formula $(R'')_4N^+X^-$, $(R'')_3N$, $(R'')_2NH$ and $R''NH_2$ in which R" is an alkyl group, an alkoxy group or an alkyl group which can be substituted with one or more alkyl and/or alkoxy groups and X is an anion.

9. The process of claim 1, wherein the co-catalyst is selected from the group consisting of triphenylphosphine, trimethoxyphenylphosphine, trichlorophenylphosphine and tetrabutyl phosphonium bromide.

10. The process of claim 1, wherein the amount of co-catalyst ranges from 0.005 to 1% by weight, based on the total weight of monomers and photopolymerization catalyst.

11. The process of claim 1, wherein the episulfide monomers are diepisulfide monomers.

12. The process of claim 11, wherein the diepisulfide monomers are represented by formula:

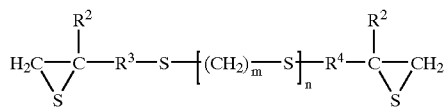

in which $R^2$ is defined as above, $R^3$ and $R^4$, independently from each other, represents

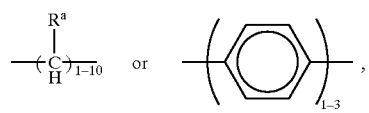

where $R^a$ designates H, alkyl, aryl, alkoxy, aryloxy, alkylthio or arylthio and n is an integer from 0 to 4 and m is an integer from 0 to 6.

13. The process of claim 12, wherein the diepisulfide monomer is bis-2,3-(epithiopropyl)sulfide or bis-2,3-(epithiopropyl)disulfide.

14. The process of claim 1, further comprising a pre-heating step of the mixture of (a) prior to step (b).

15. The process of claim 14, wherein the pre-heating step comprises heating the mixture to a temperature ranging from 70° C. to 90° C.

16. A process for making an optical lens which comprises the steps of:
   (a) filling a molding cavity of a mold with a polymerizable composition comprising a mixture of at least one episulfide monomer and an effective amount of a photopolymerization catalyst selected from (cyclopentadienyl) ruthenium and osmium complexes and an effective amount of at least a co-catalyst selected from phosphonium salts, phosphines and amines
   (b) irradiating the mixture of (a) with an ultra-violet irradiation for polymerizing the mixture at least up to the obtention of a self-supporting gel;

(c) optionally, post-heating the self-supporting gel to further polymerize the gel; and (d) recovering the optical lens.

17. The process of claim 16, wherein the catalyst is selected from compounds of formula:

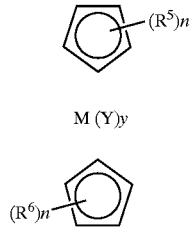

in which $R^5$ and $R^6$, independently from each other, represent a linear or branched alkyl group, an alkoxy group or an aryl group which can be substituted with one or more alkyl groups, n is an integer from 0 to 5, M is a metal selected from Ru and Os, Y is Cl, Br, I or H, and y is an integer from 0 to 2.

18. The process of claim 17, wherein M is Ru.

19. The process of claim 16, wherein the photopolymerizable catalyst is bis(cyclopentadienyl)ruthenium.

20. The process of claim 16, wherein the amount of photopolymerization catalyst ranges from 0.1 to 10% by weight based on the total weight of monomers present in the mixture.

21. The process of claim 16, wherein the phosphonium salts are salts of formula:

$(R'')_4P^+X^-$ in which each R" is independently an alkyl group, an alkoxy group or an aryl group which can be substituted with one or more alkyl groups and X is an anion.

22. The process of claim 16, wherein the phosphines have formula:

$(R''')_3P$ in which each R''' is independently an alkyl group, an alkoxy group or an aryl group which can be substituted with one ore more alkyl, alkoxy or halogeno groups.

23. The process of claim 16, wherein the amines are selected from amines of formula $(R'')_4N^+X^-$, $(R'')_3N$, $(R'')_2NH$ and $R''NH_2$ in which R" is an alkyl group, an alkoxy group or an aryl group which can be substituted with one or more alkyl and/or alkoxy groups and X is an anion.

24. The process of claim 16, wherein the co-catalyst is selected from the group consisting of triphenylphosphine, trimethoxyphenylphosphine, trichlorophenylphosphine and tetrabutyl phosphonium bromide.

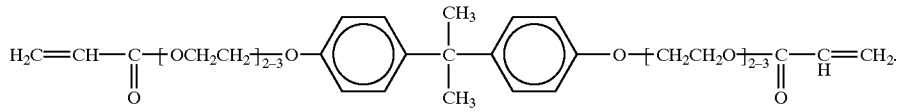

25. The process of claim 16, wherein the amount of co-catalyst ranges from 0.005 to 1% by weight, based on the total weight of monomers and photopolymerization catalyst.

26. The process of claim 16, wherein the episulfide monomers are diepisulfide monomers.

27. The process of claim 26, wherein the diepisulfide monomers are represented by formula:

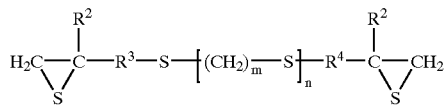

in which $R^2$ is defined as above, $R^3$ and $R^4$, independently from each other, represents:

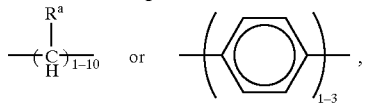

where $R^a$ designates H, alkyl, aryl, alkoxy, aryloxy, alkylthio or arylthio and n is an integer from 0 to 4 and m is an integer from 0 to 6.

28. The process of claim 26, wherein the diepisulfide monomer is bis-2,3-(epithiopropyl)sulfide or bis-2,3-(epithiopropyl)disulfide.

29. The process of claim 16, wherein the mixture of step (a) further comprises one or more photopolymerizable monomers selected from polythiol monomers, (meth)acrylate monomers, and epoxy monomers.

30. The process of claim 29, wherein the epoxy monomer is present at a ratio of 10% or less based on the total weight of the monomers in the composition.

31. The process of claim 29, wherein the polythiol monomers are represented by formula:

$R'(SH)_{n'}$

In which n' is an integer from 2 to 6 and R' is an organic group of valency equal to n'.

32. The process of claim 29, wherein the (meth)acrylate monomers are selected from the group consisting of ethylene glycol dimethacrylate, propylene glycol, dimethacrylate, tetramethylene glycol dimethacrylate, polyethylene glycol dimethacrylate, trimethylolpropane triacrylate, pentaerythritolpropane trimethacrylate, ethoxylated bisphenol-A diacrylate, 1,6-hexanediol dimethacrylate, urethane diacrylate and epoxy diacrylate.

33. The process of claim 23, wherein the (meth)acrylate monomer is represented by formula:

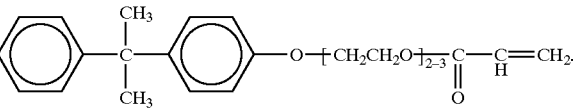

34. The process of claim 16, wherein the post-heating step comprises heating the gel for 1 to 2 hours at a temperature ranging from 80 to 120° C.

35. The process of claim 16, further comprising prior to step (b) a pre-heating step of the mixture of step (a) to a temperature of 70° C. to 90° C.

* * * * *

UNITED STATES PATENT AND TRADEMARK OFFICE
CERTIFICATE OF CORRECTION

PATENT NO. : 6,592,801 B2
DATED : July 15, 2003
INVENTOR(S) : Wanigatunga et al.

It is certified that error appears in the above-identified patent and that said Letters Patent is hereby corrected as shown below:

<u>Title page,</u>
Item [57], ABSTRACT, please delete "A process for polymerizing episulfide monomers comprising the steps of:

(c) mixing to an episulfide monomer or a mixture of episulfide monomers an effective amount of at least one photopolymerization catalyst selected from the group consisting of (cyclopentadienyl) ruthenium and osmium complexes and an effective amount of at least a co-catalyst selected from phosphonium salts, phosphines and amines; and
    (d) irradiating the mixture of (a) with an ultra-violet radiation to polymerize the mixture."

and replace with:

--A process for polymerizing episulfide monomers comprising the steps of:
    (a) mixing to an episulfide monomer or a mixture of episulfide monomers an effective amount of at least one photopolymerization catalyst selected from the group consisting of (cyclopentadienyl) ruthenium and osmium complexes and an effective amount of at least a co-catalyst selected from phosphonium salts, phosphines and amines; and
    (b) irradiating the mixture of (a) with an ultra-violet radiation to polymerize the mixture.--therefor.

<u>Column 9,</u>
Line 39, please delete "photopolymelization" and insert -- photopolymerization -- therefor.
Lines 47 to 56, please delete "
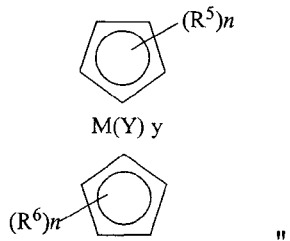
"

UNITED STATES PATENT AND TRADEMARK OFFICE
CERTIFICATE OF CORRECTION

PATENT NO. : 6,592,801 B2
DATED : July 15, 2003
INVENTOR(S) : Wanigatunga et al.

It is certified that error appears in the above-identified patent and that said Letters Patent is hereby corrected as shown below:

<u>Column 9, cont'd,</u>
Lines 47 to 56, and insert --

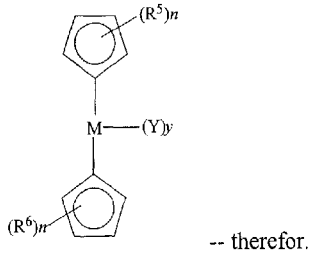

-- therefor.

<u>Column 10,</u>
Line 13, please delete "ore" and insert -- or -- therefor.

<u>Column 11,</u>
Lines 6 to 15, please delete

"
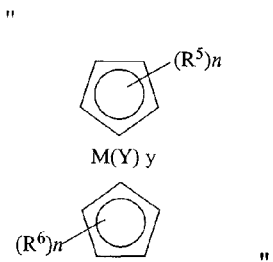
"

and insert --

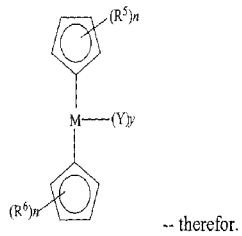

-- therefor.

UNITED STATES PATENT AND TRADEMARK OFFICE
CERTIFICATE OF CORRECTION

PATENT NO. : 6,592,801 B2
DATED : July 15, 2003
INVENTOR(S) : Wanigatunga et al.

It is certified that error appears in the above-identified patent and that said Letters Patent is hereby corrected as shown below:

Column 11,
Line 42, please delete "ore" and insert -- or -- therefor.

Signed and Sealed this

Fourth Day of November, 2003

JAMES E. ROGAN
*Director of the United States Patent and Trademark Office*